Nov. 1, 1949.　　O. W. HETZLER ET AL　　2,486,651
ELECTRICAL METER TESTING DEVICE
Filed Oct. 27, 1947
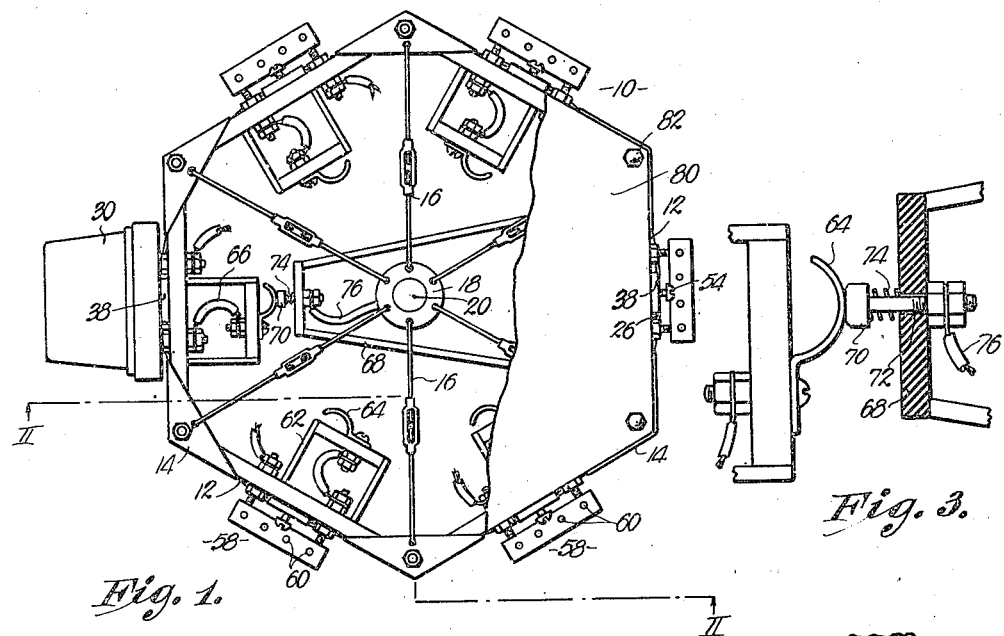
Fig. 1.
Fig. 3.
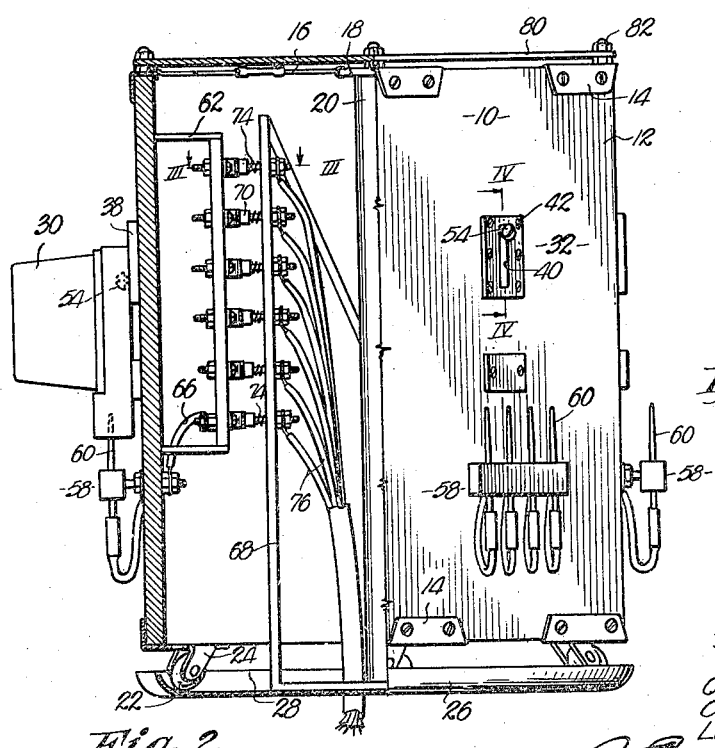
Fig. 2.
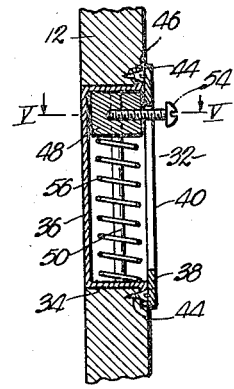
Fig. 4.
Fig. 5.
INVENTORS.
Owen W. Hetzler
Clarence A. Sloan
Lawrence W. Jones
BY
ATTORNEY Patented Nov. 1, 1949

2,486,651

UNITED STATES PATENT OFFICE 2,486,651

ELECTRICAL METER TESTING DEVICE

Owen W. Hetzler, Clarence A. Sloan, and
Lawrence W. Jones, Kansas City, Mo.

Application October 27, 1947, Serial No. 782,290

3 Claims. (Cl. 175—183)

This invention relates to the field of electrical testing equipment and particularly to a device for testing the conventional electrical meter, the primary object being to present a device of this character that is adapted to mount a plurality of meters for testing and operable to speed the procedure tremendously.

The most important object of this invention is the provision of an electrical meter testing device having a rotatable support in the form of a vertical drum provided with a plurality of planar faces for receiving the meters to be tested and having structure for bringing the said meters consecutively into a test circuit upon rotation of the support.

Another important object of this invention is the provision of a mounting means for each of the meters on the rotatable support constituting a vertically reciprocable follower block provided with a pin for receiving the meter and having a spring for returning the block to a normal inoperative position when the meter is removed therefrom.

A further object of this invention is the provision of an electrical meter testing device having a plurality of stationary electrical contacts within the rotatable drum and a number of brush contacts for each of the meters upon the drum movable into engaging relationship with the stationary contacts upon rotation of the support to bring the meter electrically joined to the brushes into the test circuit.

Additional objects will be made clear or become apparent during the course of the following specification, reference being had to the accompanying drawing, wherein:

Fig. 1 is a top plan view of an electrical meter testing device made in accordance with our present invention, a portion of the top thereof being broken away to reveal details of construction.

Fig. 2 is a cross sectional view taken on irregular line II—II of Fig. 1.

Fig. 3 is a fragmentary enlarged cross sectional view taken on line III—III of Fig. 2.

Fig. 4 is a fragmentary enlarged cross sectional view taken on line IV—IV of Fig. 2; and Fig. 5 is a fragmentary cross sectional view taken on line V—V of Fig. 4.

In the drawing, a rotatable support broadly designated by the numeral 10 includes a number of vertical walls 12, there being six walls 12 shown in the device chosen for illustration, held together at the top and bottom thereof by a plurality of brackets 14. These walls 12 are disposed to present a hollow drum and a number of turnbuckle braces 16 interconnect the brackets 14 at the top of the walls 12 with a plate 18. This plate 18 has a central opening therethrough for receiving a vertical shaft 20 rigidly connected at the lowermost end thereof to any supporting means for the device (not shown).

A number of castors 22 at the lowermost end of the support 10 are rotatably mounted in angularly disposed brackets 24 suitably attached to the walls 12 of support 10. A circular track 26 also suitably supported by a table or the like to which the shaft 20 is affixed, receives the castors 22 in the manner clearly illustrated in Fig. 2. This track 26 is ring-like and has upwardly and outwardly flared side walls 28 for receiving the castors 22. The entire support 10 therefore, is free to rotate upon the track 26 since the ring 18 is freely rotatable upon the shaft 20. The side walls 28 of the track 26 cooperate with the turnbuckles 16 in maintaining the support 10 in a given path of travel.

The electrical meters 30 to be tested are attached to the support 10 through the medium of mounting means detailed in Figs. 4 and 5 and broadly designated by the numeral 32. There is a mounting means 32 upon each of the six walls 12 of the support 10.

A slot 34 is formed in the wall 12 on a median line between the vertical edges thereof and slightly above the horizontal center of this wall 12. An open front case 36, having lateral flanges 46, is disposed within slot 34 and held in place by screws 44 passing through flanges 46 and extending into wall 12. A number of screws 42 hold a plate 38 secured to flanges 46 and in covering relationship to case 36, plate 38 in turn being provided with a vertical slot 40.

A follower block 48 is slidably mounted for vertical reciprocation within the case 36 and is guided through the medium of a pair of opposed vertical ribs 50 formed within the case 36. Opposed grooves 52 formed in the block 48 receive the two ribs 50 of case 36. A screw or the like 54 threaded into the block 48 passes through the slot 40 of the plate 38 and extends a distance externally of the case 36 and the plate 38. A coil spring 56 interposed between the block 48 and the lowermost end of the case 36 yieldably maintains the block 48 and the screw 54 secured thereto at the uppermost end of their respective paths of travel.

When the meter 30 is placed upon the hook or screw 54 on the block 48 by medium of one of the conventional mounting openings formed in the base plate of meter 30, the weight of this meter 30 will cause the block 48 to move downwardly within the case 36 against the action of the spring 56.

A terminal assembly of conventional character and broadly designated by the numeral 58 is mounted upon each of the walls 12 of the support 10 in underlying relationship to the mounting means 32 for the meter 30. This assembly 58 includes a number of terminal posts 60 that are received by contact openings within the meter 30 as clearly illustrated in Fig. 2. This assembly 58 is rigidly secured to the support 10 and the posts 60 are vertically slidable and provided with springs for holding the same at the uppermost ends of their respective paths of travel. Thus as the meter 30 is placed upon its mounting means 32 the same will move downwardly to a point of engagement with the posts 60 and the latter will be held rigidly in electrical contacting relationship with the meter 30.

Mounted on the innermost face of each of the walls 12 in opposed relationship to the assembly 58 and the meter 30 is a bracket 62 having a plurality of brushes 64 mounted thereon. These brushes 64 are formed from resilient material and each has connection with the assembly 58 through the medium of wire 66. Rigidly secured to the vertical shaft 20 within the support 10 is a bracket 68. This bracket 68 has a plurality of contact pins 70 arranged thereon in a vertical line, there being a contact 70 for each of the brush contacts 64. These pins 70 are slidably mounted within openings 72 in the bracket 68 and springs 74 coiled about the pins 70 bias the same outwardly toward the contacts 64. It is clear, therefore, that as the support 10 is rotated, the contacts 64 on each of the brackets 62 will be successively brought into engaging relationship with the respective stationary contacts 70 upon the bracket. These stationary contacts 70 are connected within the test circuit for the meters 30 through the medium of wires 76.

The operator for the meter testing device just described sits or stands oppositely to the bracket 68 and as he rotates the support 10, the meters 30 upon their respective mounting means 32, will be brought successively into the test circuit (not shown); after the meter 30 has been tested, he merely rotates the support 10 to bring the next meter into the test circuit. An assistant for the operator positioned on the opposite side of the support 10, places the meters 30 upon the mounting means 32 and removes the tested meters. Thus as the device is placed in operation, a large number of meters can be tested in a relatively short time and the same will automatically be brought into the test circuit without complicated adjustments and attachments being made by the operator. When the operator's assistant places the meters 30 upon the support 10, there is absolutely no danger because only one of the assemblies 58 can be within the test circuit at one time. By the same token, it is not necessary for the operator to handle the meter 30 or the assembly 58 while the testing takes place and therefore, the entire operation can be completed without undue danger to any workman.

If desired, a plate 80 may be placed upon the uppermost end of the support 10 through the medium of bolts or the like 82. The placing of the meters 30 into operative engagement with the assembly 58 is simple and efficient in that the assistant merely moves the meter 30 upon the pin 54 and allows the same to move downwardly by gravity where the same receives the posts 60.

Upon removal of the meter 30, the follower block 48 will return to the normal inoperative position at the top of case 36 as shown in Fig. 4. A positive contact is assured between the members 64 and 70 not only because of the resilient character of the brushes 64 but because of the spring 74 tending to hold the pin 70 outwardly where the same will be engaged by the brush 64 as the support 10 is rotated. It is apparent also that tests may be made upon the meters 30 having extremely high potentials without danger to the operator and that this advantage is highly important and a decided improvement over the conventional meter testing equipment.

While only the essential characteristics of the electrical meter testing apparatus have been illustrated and described, it is understood that many variations may be made and that such additions as automatic means of rotating the support 10 may be included without departing from the spirit of this invention or scope of the appended claims.

Having thus described the invention, what is claimed as new and desired to be secured by Letters Patent is:

1. In an electrical meter testing device, a test circuit having a plurality of contacts; a rotatable support; means for removably mounting a plurality of meters to be tested upon said support; a set of test circuit terminals for each meter carried by the support and disposed for operative engagement with the respective meters when the same are on their mounting means; and structure for moving successive sets of terminals and the meter connected therewith into electrical connection with said test circuit contacts upon rotation of said support, said mounting means each comprising a spring loaded, vertically reciprocable block mounted on said support and having a pin for receiving the meter to be mounted thereon.

2. In an electrical meter testing device, a test circuit having a plurality of contacts; a rotatable support; means for removably mounting a plurality of meters to be tested upon said support; a set of test circuit terminals for each meter carried by the support and disposed for operative engagement with the respective meters when the same are on their mounting means; and structure for moving successive sets of terminals and the meter connected therewith into electrical connection with said test circuit contacts upon rotation of said support, said mounting means each comprising a spring loaded, vertically reciprocable block mounted on said support and having a pin for receiving the meter to be mounted thereon, said spring being adapted to permit movement of the block and the meter thereon to one end of their paths of travel by the weight of said meter.

3. In an electrical meter testing device, a test circuit having a plurality of contacts; a rotatable support; means for removably mounting a plurality of meters to be tested upon said support; a set of test circuit terminals for each meter carried by the support and disposed for operative engagement with the respective meters when the same are on their mounting means; and structure for moving successive sets of terminals and the meter connected therewith into electrical connection with said test circuit contacts upon rotation of said support, said mounting means each comprising a spring loaded, vertically reciprocable block mounted on said support and having a pin for receiving the meter to be mounted thereon, said spring being adapted to permit movement of the block and the meter thereon to one end of their paths of travel by the weight of said meter, and means for guiding the block through its path of travel.

OWEN W. HETZLER.
CLARENCE A. SLOAN.
LAWRENCE W. JONES.

REFERENCES CITED

The following references are of record in the file of this patent:

UNITED STATES PATENTS

| Number | Name | Date |
|---|---|---|
| 1,680,849 | Blakeslee | Aug. 14, 1928 |
| 1,818,795 | Emens | Aug. 11, 1931 |